United States Patent
Tchan et al.

(10) Patent No.: US 7,505,778 B2
(45) Date of Patent: Mar. 17, 2009

(54) WIRELESS COMMUNICATION APPARATUS AND METHOD USING AN ADAPTIVE CREDIT REDISTRIBUTION ALGORITHM

(75) Inventors: Kyun-hyon Tchan, Seoul (KR); Ki-soo Chang, Suwon-si (KR); Doo-seop Eom, Seoul (KR); Tae-jin Lee, Suwon-si (KR); Jong-hun Park, Seoul (KR); Jong-soo Oh, Seoul (KR); Yang-ick Joo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1073 days.

(21) Appl. No.: 10/788,316

(22) Filed: Mar. 1, 2004

(65) Prior Publication Data

US 2004/0177038 A1   Sep. 9, 2004

(30) Foreign Application Priority Data

Feb. 28, 2003   (KR) ............... 10-2003-0012900

(51) Int. Cl.
*H04B 7/00* (2006.01)
(52) U.S. Cl. .............. 455/518; 455/41.2; 455/512; 455/513; 455/412.1; 370/320; 370/412; 370/333; 705/39
(58) Field of Classification Search ........... 455/518, 455/41.2, 512, 513, 412.1; 370/320, 412, 370/333; 705/39
See application file for complete search history.

(56) References Cited

U.S. PATENT DOCUMENTS 6,975,613 B1 * 12/2005 Johansson ................ 370/338

(Continued)

FOREIGN PATENT DOCUMENTS

EP   1246399 A1   10/2002

OTHER PUBLICATIONS

Simon Baatz, 2001, IEEE, Adaptive Scatternet Support for Bluetooth using Sniff mode, pp. 116-120.*

(Continued)

*Primary Examiner*—Edward Urban
*Assistant Examiner*—Amar Daglawi
(74) *Attorney, Agent, or Firm*—Sughrue Mion, PLLC

(57) ABSTRACT

A wireless communication method according to the present invention, in a Bluetooth device connected to multiple piconets and operating in a scatter mode, includes steps of (a) establishing credit values by link for the multiple piconets, and the total sum of the credit values by link as a temporary account value; (b) updating the credit values by link and the temporary account value every slot based on a predetermined manner; (c) performing communications through a link selected based on a comparison result of the credit values by link at each Presence Point(PP); and (d) unevenly redistributing predetermined credit values based on characteristics by link and returning to the step (b) in one of the two cases in which the communications are interrupted with a POLL_NULL sequence and the temporary account value becomes the same as the total number, n, of links.

10 Claims, 9 Drawing Sheets

U.S. PATENT DOCUMENTS

| | | | | |
|---|---|---|---|---|
| 7,058,050 | B2* | 6/2006 | Johansson et al. | 370/386 |
| 7,203,483 | B2* | 4/2007 | Park | 455/412.1 |
| 2002/0142789 | A1* | 10/2002 | Kuhl et al. | 455/512 |
| 2003/0081603 | A1* | 5/2003 | Rune | 370/390 |
| 2003/0092386 | A1* | 5/2003 | Miklos et al. | 455/41 |
| 2003/0108010 | A1* | 6/2003 | Kim et al. | 370/333 |
| 2003/0125010 | A1* | 7/2003 | Jung | 455/404 |
| 2003/0140110 | A1* | 7/2003 | Cho | 709/208 |
| 2003/0152110 | A1* | 8/2003 | Rune | 370/509 |
| 2004/0085981 | A1* | 5/2004 | Lee et al. | 370/412 |
| 2005/0041613 | A1* | 2/2005 | Kuhl et al. | 370/320 |

OTHER PUBLICATIONS

Simon Baatz, et al., Adaptive Scatternet Support for Bluetooth using Sniff Mode, Local Computer Networks, 2001. Proceedings. LCN 2001. 26th Annual IEEE Conference on, Nov. 14, 2001, pp. 112-120.

Simon Baatz et al., Bluetooth Scatternets: An Enhanced Adaptive Scheduling Scheme, IEEE INFOCOM 2002, The Conference on Computer Communications, Jun. 23-27, 2002, pp. 782-790, vol. 1 of 3.

Liron Har-Shai et al., Inter-Piconet Scheduling in Bluetooth Scatternets, Opnetwork 2002, Aug. 2002, pp. 1-11.

Yang-Ick Joo et al., Power-Efficient and QoS-Aware Scheduling in Bluetooth Scatternet for Wireless PANs, IEEE Transactions on Consumer Electronics, Nov. 2003, pp. 1067-1072, vol. 49, No. 4.

* cited by examiner

WIRELESS COMMUNICATION APPARATUS AND METHOD USING AN ADAPTIVE CREDIT REDISTRIBUTION ALGORITHM

BACKGROUND OF THE INVENTION

The present invention claims foreign priority under 35 U.S.C. § 119 based on Korean Patent Application No. 10-2003-0012900, filed Feb. 28, 2003, the contents of which are incorporated herein by reference

1. Field of the Invention

The present invention relates to a wireless communication apparatus and method, and more particularly, to a wireless communication apparatus and method capable of supporting Quality of Service (QoS) by link layer by using an adaptive credit redistribution algorithm in a Bluetooth scatter mode.

2. Description of the Prior Art

The Bluetooth technology has been basically developed to remove cables for connecting devices such as mobile phone headsets, handsets, portable computers, and so on. Bluetooth technology is a wireless technology of low-cost, low power consumption, and short range. The Bluetooth operates in the unlicensed 2.4 GHz ISM (Industrial, Scientific, and Medical) band, the master in a Bluetooth network refers to a Bluetooth device initializing data exchanges, and slaves refer to Bluetooth devices responding to the master.

One master can connect to up to seven active slaves, and, as such, a network formed through the connections of one master to one or more slaves is referred to as a piconet. All slaves in the piconet use a master's clock and address so as to be synchronized to the master's frequency hopping sequence.

The Bluetooth technology may need to connect such piconets to one another in an aspect of the characteristics of an ad-hoc network, which configures a scatternet, accordingly. That is, the scatternet refers to a collection of piconets linked to one another by a common unit.

FIG. 1A and FIG. 1B are views for explaining a scatternet of a Bluetooth system. FIG. 1A shows a unit 15 interconnecting piconets 10 and 20 and operating as a slave in both piconets 10 and 20, and FIG. 1B shows a unit 35 interconnecting piconets 30 and 40, and operating as a master in one piconet 30 and as a slave in the other piconet 40.

As shown in FIGS. 1A and 1B, the units 15 and 35 interconnecting the piconets operate as slaves in both piconets, and operate as a master in one piconet and as a slave in the other piconet, respectively, but do not operate as masters in the two different piconets, which is because a piconet is a collection of devices following a frequency hopping sequence determined by the Bluetooth clock and the Bluetooth device address of a master. That is, all devices having the same master form the same piconet, and two different masters have to form two piconets.

In the meantime, a unit interconnecting multiple piconets is referred to as a Participant in Multiple piconets (PMP) node. That is, the PMP node is a common unit simultaneously connected to the multiple piconets, and the operations of such PMP nodes follow a scatter mode. The scatter mode is a connection mode proposed for efficient operations of a Bluetooth scatternet, which enables time division-based devices to simultaneously participate in multiple piconets.

The scatter mode defines a presence point (PP) which is a point of time that a PMP node must operate in each piconet, and uses a scheme enabling communications with a corresponding piconet at a scheduled PP only.

However, since it is not likely that a corresponding master and slaves for piconet communications would be enabled to perform communications at a PP all the time, a scheduling algorithm for the credit-based scheme has been proposed to efficiently manage the piconet communications. The credit-based scheme assigns a relatively high priority to a link to which unfair service opportunities have been given, to thereby provide fairness for relative service opportunities. To do so, the number of slots available for each device with respect to each link is calculated, which is represented as credits. One credit represents that one slot is available from a corresponding link.

FIG. 2 is a view for explaining a credit scheme. FIG. 2 shows an event in which three piconets are interconnected at a PMP node so that there exist three links Link1, Link2, and Link3. In such circumstances, a credit value is given to each link, and a value for a temporary account provided to keep the overall sum of credits consistent is set. The overall sum of credits becomes '0' at the beginning of operations.

FIG. 2 shows a state in which a communication event (CE) happens at the link Link1 with the highest credit value for the first time. The credit account of the link Link1 in communication is decremented by one credit every slot, and the credit accounts of the links Link2 and Link3 remain unchanged.

The temporary account is increased by one credit every slot. If the temporary account holds 3 credits, the number of which is equal to the total number of links, the temporary account is decremented by 3, that is, by the total number of links, and the decremented credits are equally distributed to each link so that the credit account of each link is incremented by one. The credit accounts except for the temporary account limit their credits to $N_{max\text{-}credit}$, through which the maximum available burst by link is limited.

In FIG. 2, if the credit account of the link Link1 has credits of 2 and the credit account of the link Link2 holds credits of −1 when the second PP occurs, the link Link1 keeps carrying out communications. However, at the third PP, the credit account of the link Link1 holds credits of −1 and the credit account of the link Link3 holds a credit of 0, so that the link Link1 stops its communications and the link Link3 carries out its communications.

In the meantime, when a new link is added, the credit account of the new link is initialized to a credit of 0, and, on the contrary, when one link is disconnected, the credits of the link are added to the temporary account and then evenly distributed to the remaining links. Further, as aforementioned, a link carrying out communications stops its ongoing communications when a different link has a higher credit at a new PP or there is no polling during $T_{scatter\text{-}poll}$ slot, and, when communications are terminated early with the lapse of a timeout period due to a POLL-NULL sequence or transmission errors, a connection is made in advance for a next PP in order for the new link to start communications regardless of credits.

In the event that communications are interrupted in a state of a POLL-NULL sequence or no further data can be transmitted or received, the credits of the link are distributed to the other links. At this time, a redistributed credit amount is calculated in Equation 1 as follows:

$$C = \max\left\{\left[\frac{n-1}{n}(ac_{red} - ac_{\min})\right], \left[\frac{n-1}{n}(ac_{red} - ac_{\max} + N_{switch\text{-}th})\right]\right\}, \quad \text{[Equation 1]}$$

wherein n denotes the total number of links, $ac_{red}$ denotes a credit value for a link to be redistributed, $ac_{max}$ denotes the maximum credit value out of credit values of links to be redistributed, $ac_{min}$ denotes the minimum credit value out of credit values of links to be redistributed, and $N_{switch-th}$ denotes a threshold value for preventing frequent switchovers among piconets.

The credit account of a corresponding link is decremented as much as a credit amount calculated in Equation 1, and such a credit amount is evenly redistributed to the remaining links. According to the above scheme, fairness in service opportunities is provided to links.

Meanwhile, the credit scheme is an effective way supporting the operations of the Bluetooth scatternet, but it has a problem that efficient scheduling cannot be supported according to traffic characteristics of each master-slave pair or each piconet connected to a PMP node. In particular, considering the performance with respect to QoS, such a scheme has a problem that it is difficult to efficiently allocate resources in consideration of diverse data traffic characteristics of links.

SUMMARY OF THE INVENTION

The present invention has been devised to solve the above problems, so it is an object of the present invention to provide a wireless communication apparatus and method for efficiently utilizing wireless resources to be wasted upon operating a Bluetooth system in the scatter mode, maintaining proper fairness for links connected to a PMP node, and satisfying diverse QoS requirements for each link.

In order to achieve the above object, a wireless communication method according to the present invention, which is used for a Bluetooth device connected to multiple piconets and operating in a scatter mode, comprises steps of (a) establishing credit values by link for the multiple piconets, and the total sum of the credit values by link as a temporary account value; (b) updating the credit values by link and the temporary account value every slot based on a predetermined manner; (c) performing communications through a link selected based on a comparison result of the credit values by link at each Presence Point(PP); and (d) unevenly redistributing predetermined credit values based on characteristics by link and returning to the step (b) in one of the two cases of the communications being interrupted with a POLL_NULL sequence occurring and the temporary account value becoming the same as the total number, n, of links.

Preferably, the step (b) updates the credit values by link by incrementing by one a credit value of a link performing communications every slot and keeping credit values of the other links unchanged, and updates the temporary account value by repeating procedures of incrementing the temporary account value by one every slot and decrementing the temporary account value by n if the temporary account value becomes the same as the total number, n, of the links.

Preferably, the step (c) performs the communications through a link having the largest credit value out of the credit values by link.

Preferably, the step (d) redistributes the credit value n to the credit values by link based on the inverse of $T_{scatter\_poll}$ by link if the temporary account value becomes the same as the total number, n, of links, the $T_{scatter\_poll}$ being a parameter negotiated between corresponding piconets by the Link Manager Protocol (LMP) with a scatternet formed.

Further, the step (d) redistributes a credit value C calculated by the following formula to credit values of links except for a link to which a POLL_NULL sequence is sent, based on the inverse of the $T_{scatter\_poll}$ by link, if the POLL_NULL sequence occurs:

$$C = \max\left(\left[\frac{n-1}{n}(ac_{red} - ac_{min})\right], \left[\frac{n-1}{n}(ac_{red} - ac_{max} + N_{switch-th})\right]\right),$$

wherein n denotes the total number of links, $ac_{red}$ a credit value of a link to be redistributed, $ac_{max}$ the maximum credit value out of credit values of links to be redistributed, $ac_{min}$ the minimum credit value out of credit values of links to be redistributed, and $N_{switch-th}$ a threshold value for preventing frequent switchovers among piconets.

Further, the credit values to be redistributed to the links are preferably obtained by the following formula:

$$\left(\left[\frac{T_{scatter\_poll,1}^{-1} \times c}{\sum_{i=1}^{n} T_{scatter\_poll,i}^{-1}}\right], \left[\frac{T_{scatter\_poll,2}^{-1} \times c}{\sum_{i=i}^{n} T_{scatter\_poll,i}^{-1}}\right], \ldots, n - \sum_{i=1}^{n-1}\left[\frac{T_{scatter\_poll,i}^{-1} \times c}{\sum_{i=1}^{n} T_{scatter\_poll,i}^{-1}}\right]\right)$$

In the meantime, a Bluetooth wireless communication apparatus connected to multiple piconets and operating in a scatter mode comprises a buffer unit for storing credit values by link for the multiple piconets, and the total sum of the credit values by link as a temporary account value; a communication priority decision unit for updating the credit values by link and the temporary account value every slot based on a predetermined technique, and selecting a link to perform communications based on a comparison result of the credit values by link at each Presence Point(PP); a credit redistribution unit for unevenly redistributing predetermined credit values based on characteristics by link in one of the two cases in which the communications are interrupted with a POLL_NULL sequence occurring and when the temporary account value becomes the same as the total number, n, of links; and a communication initiation unit for initiating communications through a corresponding link selected in the communication priority decision unit.

Preferably, the communication priority decision unit updates the credit values by link by incrementing by one a credit value of a link performing communications every slot and keeping credit values of the other links unchanged, and updates the temporary account value by repeating procedures of incrementing the temporary account value by one every slot and decrementing the temporary account value by n if the temporary account value becomes the same as the total number, n, of the links.

Preferably, the credit redistribution unit selects a link having the largest credit value out of the credit values by link, as a link to perform communications.

Further, the credit redistribution unit redistributes the credit value n to the credit values by link based on the inverse of $T_{scatter\_poll}$ by link if the temporary account value becomes the same as the total number, n, of links, the $T_{scatter\_poll}$ being a parameter negotiated between corresponding piconets by the Link Manager Protocol (LMP) with a scatternet formed.

Further, if a POLL_NULL sequence occurs, the credit redistribution unit preferably redistributes a credit value C calculated by the following formula to credit values of links except for a corresponding link, based on the inverse of the $T_{scatter\_poll}$ by link:

$$C = \max\left(\left[\frac{n-1}{n}(ac_{red} - ac_{\min})\right], \left[\frac{n-1}{n}(ac_{red} - ac_{\max} + N_{switch\text{-}th})\right]\right),$$

where, n denotes the total number of links, $ac_{red}$ denotes a credit value of a link to be redistributed, $ac_{max}$ denotes the maximum credit value out of credit values of links to be redistributed, $ac_{min}$ denotes the minimum credit value out of credit values of links to be redistributed, and $N_{switch\text{-}th}$ denotes a threshold value for preventing frequent switchovers among piconets.

Further, in the credit redistribution unit, the credit values to be redistributed to the links are preferably obtained by following formula:

$$\left(\left[\frac{T_{scatter\_poll,1}^{-1} \times c}{\sum_{i=1}^{n} T_{scatter\_poll,i}^{-1}}\right], \left[\frac{T_{scatter\_poll,2}^{-1} \times c}{\sum_{i=1}^{n} T_{scatter\_poll,i}^{-1}}\right], \ldots, n - \sum_{i=1}^{n-1} \left[\frac{T_{scatter\_poll,i}^{-1} \times c}{\sum_{i=1}^{n} T_{scatter\_poll,i}^{-1}}\right]\right)$$

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENT

Hereinafter, the present invention will be described in detail with reference to the accompanying drawings.

Figure 3:
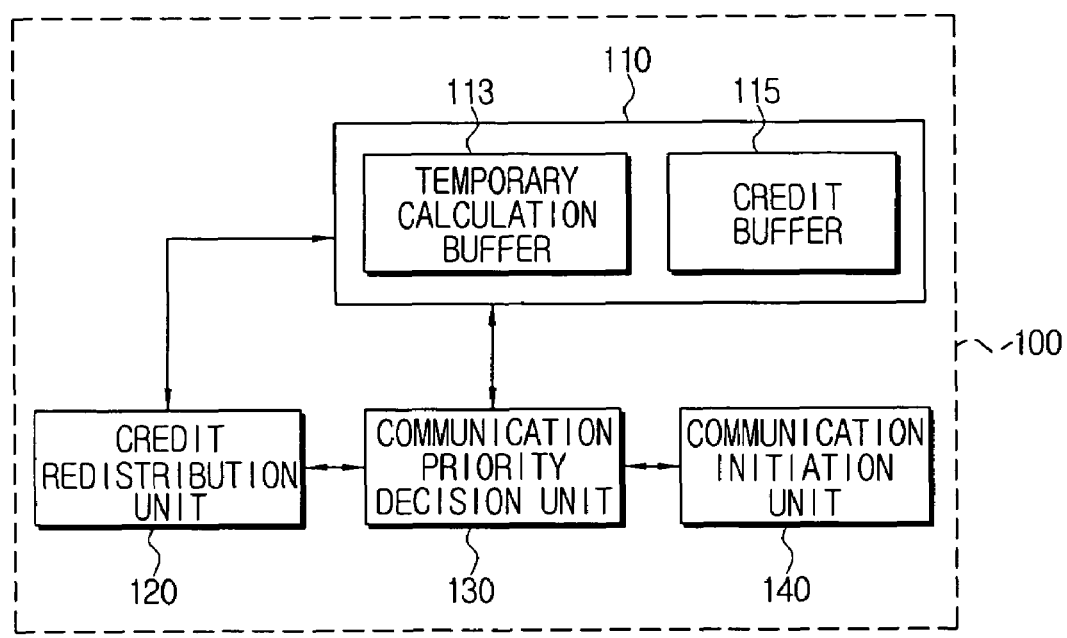
FIG. 3 is a schematic block diagram for showing a wireless communication apparatus according to an embodiment of the present invention.

FIG. 3 is a schematic block diagram for showing a wireless communication apparatus according to an embodiment of the present invention.

As shown in FIG. 3, a wireless apparatus 100 includes a buffer unit 110, a credit redistribution unit 120, a communication priority decision unit 130, and a communication initiation unit 140, and the buffer unit 110 has a temporary calculation buffer 113 and a credit buffer 115.

The credit buffer 115 of the buffer unit 110 stores credit values for links, the temporary calculation buffer 113 stores temporary account values each being a total credit value, and the credit values and the temporary account values are updated every slot.

The communication priority decision unit 130 compares link credit values stored in the credit buffer 115, and decides a link for communications. The communication initiation unit 140 enables a link decided in the communication priority decision unit 130 to perform communications.

Further, the credit redistribution unit 120 redistributes excess credits occurring in a predetermined link to the other links, which will be described later.

Figure 4:
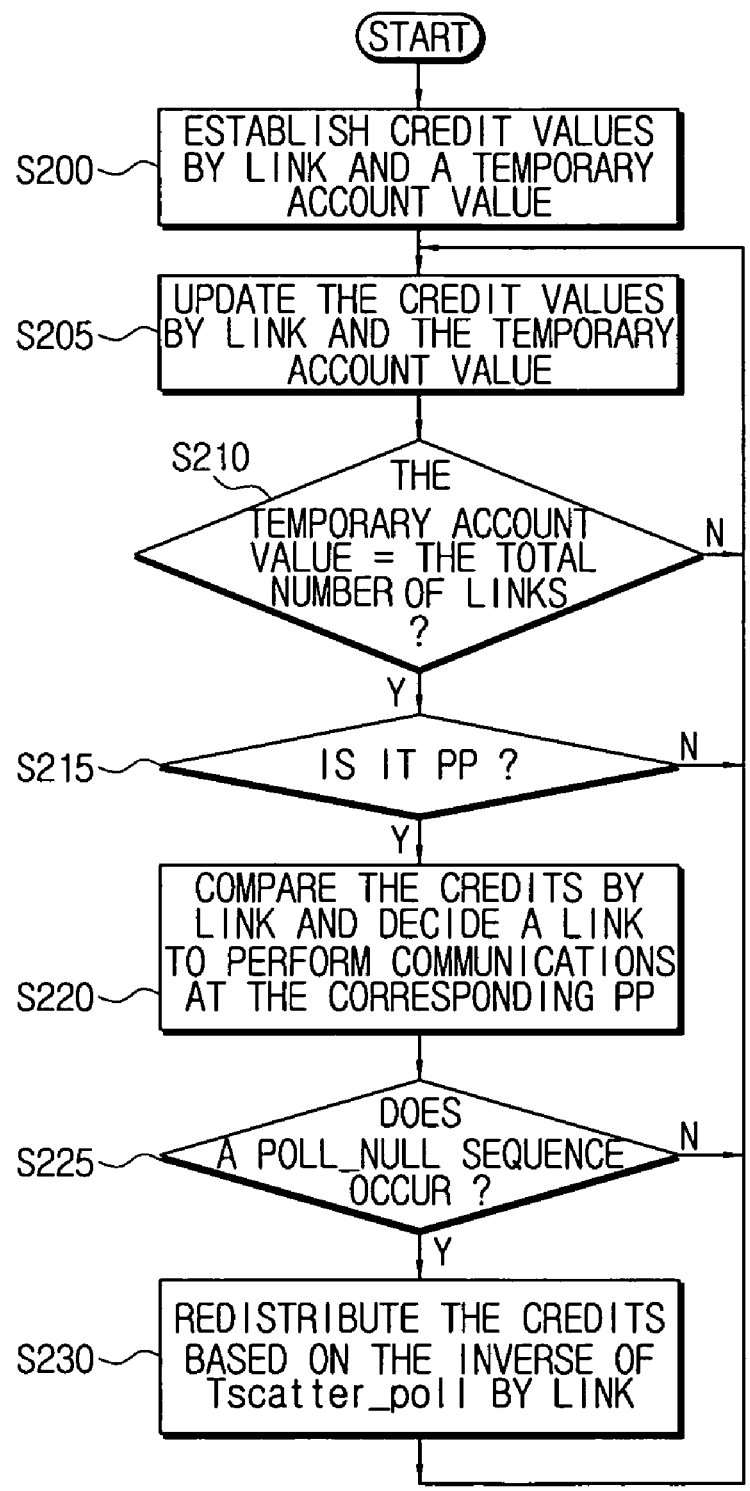
FIG. 4 is a flow chart for explaining a wireless communication method according to an embodiment of the present invention.

FIG. 4 is a flow chart for explaining a wireless communication method according to an embodiment of the present invention.

Referring to the flow chart, first, the wireless communication apparatus linked to multiple piconets establishes credit values and temporary account values by link (S200). The temporary account values become credit values established by link, and each have an initial value of '0'.

Figure 1A:
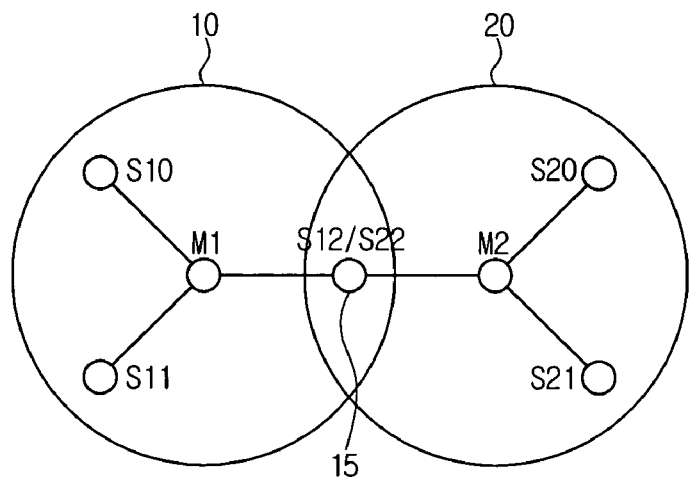
FIG. 1a and FIG. 1b are views for explaining a scatternet of a Bluetooth system.
Figure 1B:
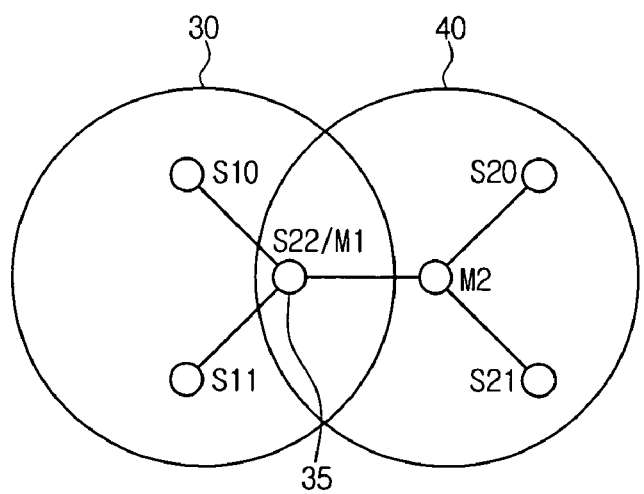
Figure 2:
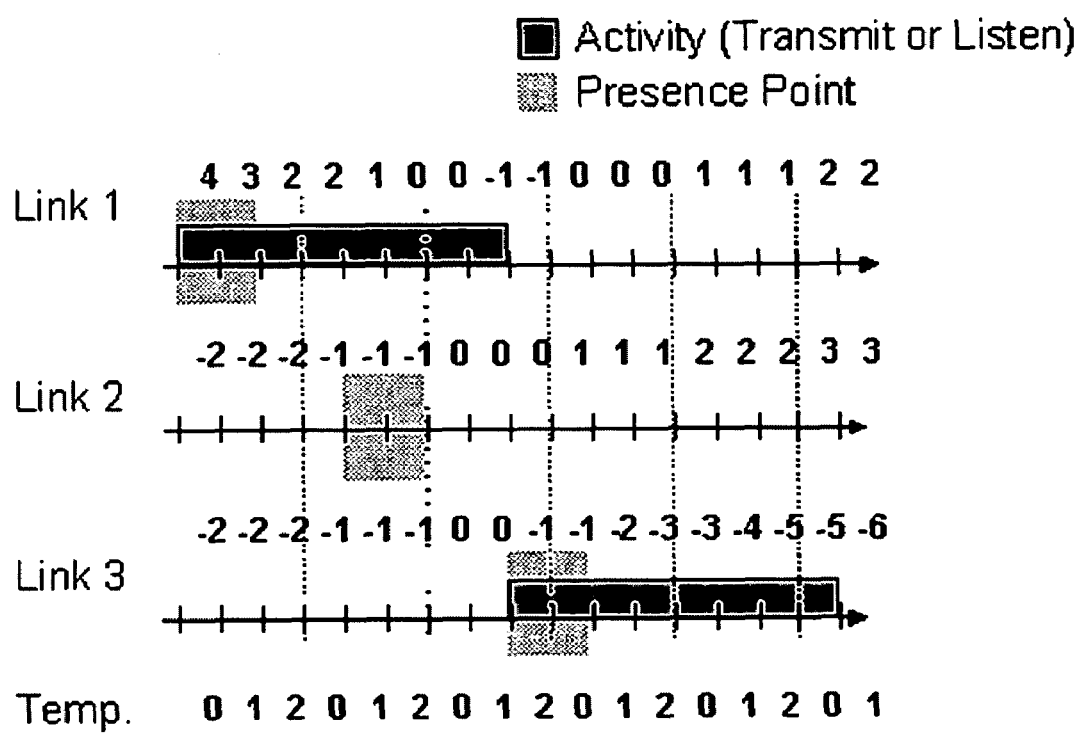
FIG. 2 is a view for explaining a credit based scheme.

If the credit values by link are completely established, the wireless communication apparatus updates the credit values by link (S205). The updates, as aforementioned in FIG. 2, are to decrement the credit value by one every slot for a link performing communications, and to keep the credit values unchanged for the other links. A process is repeated that a temporary account value is incremented by one every slot, and, when the temporary account value reaches n, the total number of links is decremented by n.

Next, the wireless communication apparatus decides whether a temporary account value is the same as the total number of links (S210). If the wireless communication apparatus is interconnected to three piconets, the total number of links becomes 3. If a temporary account value is not equal to the total number of links, the wireless communication apparatus performs an update procedure in the step S205, and, if equal, instead of evenly distributing credits by link as the same way as the related art, it performs procedures in the steps S210 to 230 which re-distribute credits to links based on the inverse of $T_{scatter\_poll}$ by link (S230).

The $T_{scatter\_poll}$ is a parameter negotiated between corresponding piconets by the Link Manager Protocol (LMP) with a scatternet formed. The meaning of the $T_{scatter\_poll}$ is to form a PP every corresponding value, and it means that the smaller a value of $T_{scatter\_poll}$ is, the more frequently a corresponding link is polled. That is, it means that a corresponding link has a relatively smaller traffic amount to be sent as the value of $T_{scatter\_poll}$ gets larger, whereas the corresponding link has a relatively large traffic amount to be sent as the value of $T_{scatter\_poll}$ gets smaller. According to the inverse of the $T_{scatter\_poll}$ by link as above, calculations are performed for credit values to be distributed to links.

Following the step S210, the wireless communication apparatus decides whether to be a PP, and, if not decides as the PP, repeats steps after the step S205, and, if decided as the PP, compares link credits to decide a link performing communications (S220). At this time, the link performing communications has the highest credit value.

While performing communications with the link decided to perform communications, the wireless communication apparatus decides whether a Poll_NULL sequence is sent (S225). As a result of the decision, the communications are interrupted when the POLL-NULL is sent, and the credits of a corresponding link are distributed to the other links.

In the above situation, an amount of credits to be distributed corresponds to a value of C calculated in Equation 1, such a credit value of C is unevenly distributed based on the inverse of $T_{scatter\_poll}$ by link to the other links except for the link to which the POLL-NULL sequence is sent. At this time, a credit value to be given by link can be expressed in Equation 2 as follows:

$$\left( \left[ \frac{T_{scatter\_poll,1}^{-1} \times c}{\sum_{i=1}^{n} T_{scatter\_poll,i}^{-1}} \right], \left[ \frac{T_{scatter\_poll,2}^{-1} \times c}{\sum_{i=1}^{n} T_{scatter\_poll,i}^{-1}} \right], \ldots, n - \sum_{i=1}^{n-1} \left[ \frac{T_{scatter\_poll,i}^{-1} \times c}{\sum_{i=1}^{n} T_{scatter\_poll,i}^{-1}} \right] \right)$$

[Equation 2]

The scheme above takes into consideration the characteristics of the links of a PMP node or QoS requirements when credits are distributed, rather than evenly assigning the credits to links.

Figure 5:
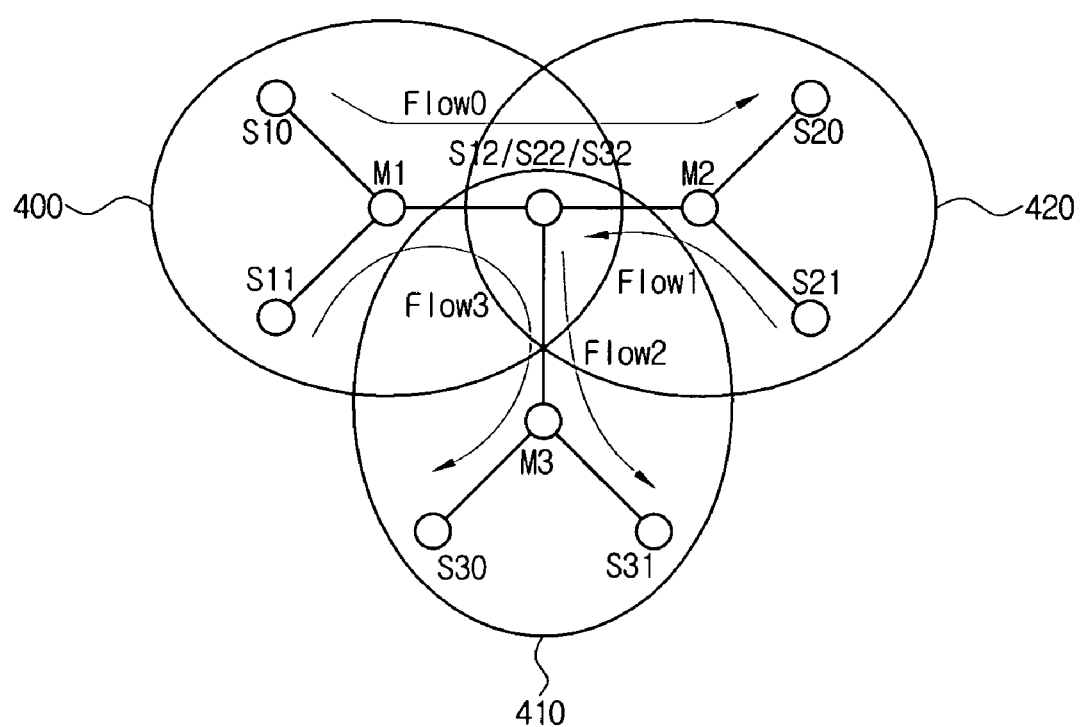
FIG. 5 is a view for explaining a computer simulation environment.

In order to verify a wireless communication method according to the present invention, computer simulations are implemented in a scatternet environment formed with three piconets 400, 410, and 420 interconnected as shown in FIG. 5. A transmission packet is considered to be smaller than a single slot packet size, and flows are defined as follows:

Flow 0: data transmission for the entire simulation period of time (S10→S20)

Flow 1: data transmission for the entire simulation period of time (S21→S22)

Flow 2: continuous data transmission from the 10000$^{th}$ slot (S22→S31)

Flow 3: data transmission in the slot interval from the first to the 24000$^{th}$ slot (S11→S30)

Further, the links from the PMP node to the piconets are denoted as link 0, link 1, and link 2 corresponding to piconet numbers, respectively, and it is assumed that a link ratio of link 0: link 1: link 2 is indicated in 1:2:3, and the parameters of Tscatter_poll are assigned to have a ratio of 6:3:2 therebetween.

Figure 6:
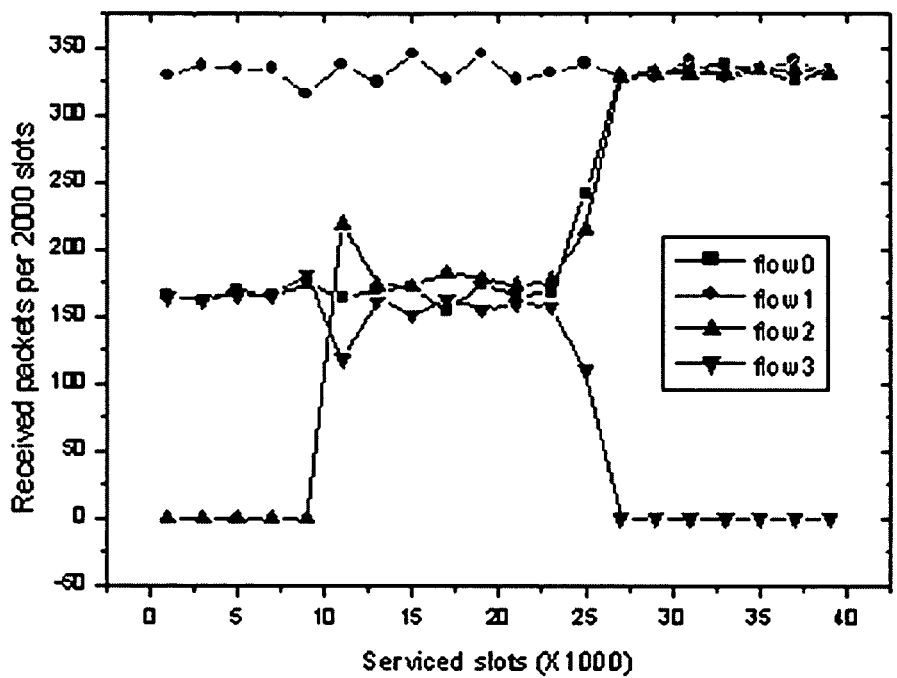
FIG. 6 is a view for showing throughput changes by flow with time when that the credit based scheme is used.
Figure 7:
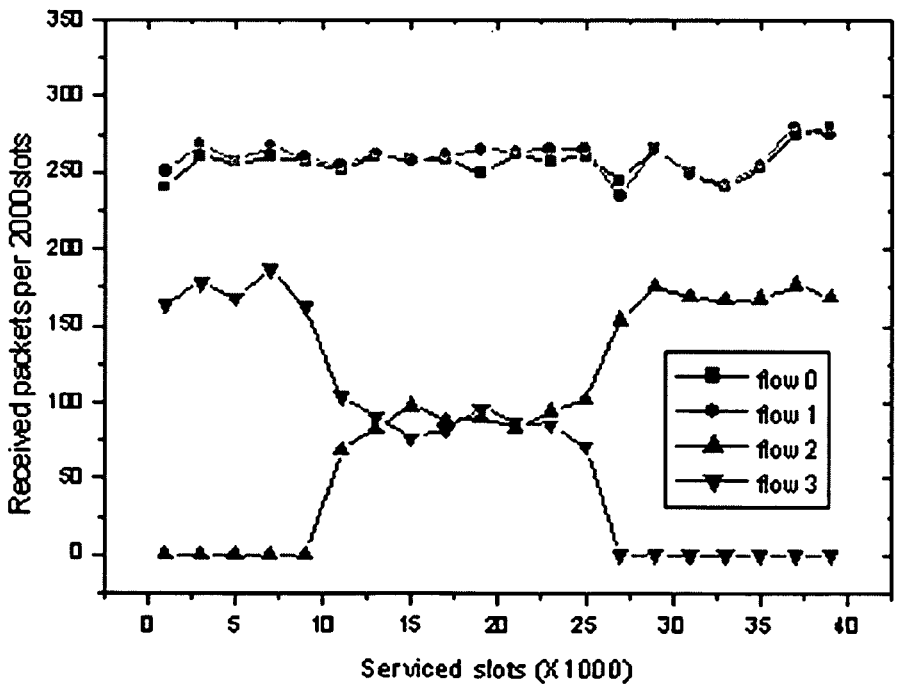
FIG. 7 is a view for showing throughput changes by flow with time when the wireless communication method according to an embodiment of the present invention is used.

FIG. 6 and FIG. 7 show observations on the number of packets received by interval with a service time increasing in order to evaluate the performance when the wireless communication method, according to an embodiment of the present invention, is applied.

FIG. 6 shows that the largest throughput is obtained in the Flow 1 having relatively small packets transmitted through a link and a poor throughput is obtained in the Flow 0 having the largest traffic amount, when the conventional credit based scheme is used.

When the wireless communication method according to an embodiment of the present invention is applied, it can be observed in FIG. 7 to improve the performance for the Flow 0 having a large traffic flow by slightly lowering the throughputs for the Flow 2 and Flow 3 compared to those in the existing credit based scheme in an interval having a large amount of data traffic between 10000 slots and 24000 slots, but satisfying the QoS requirements for the flow 0 with a throughput slightly reduced for the flow 1 having a relatively small traffic amount.

Figure 8:
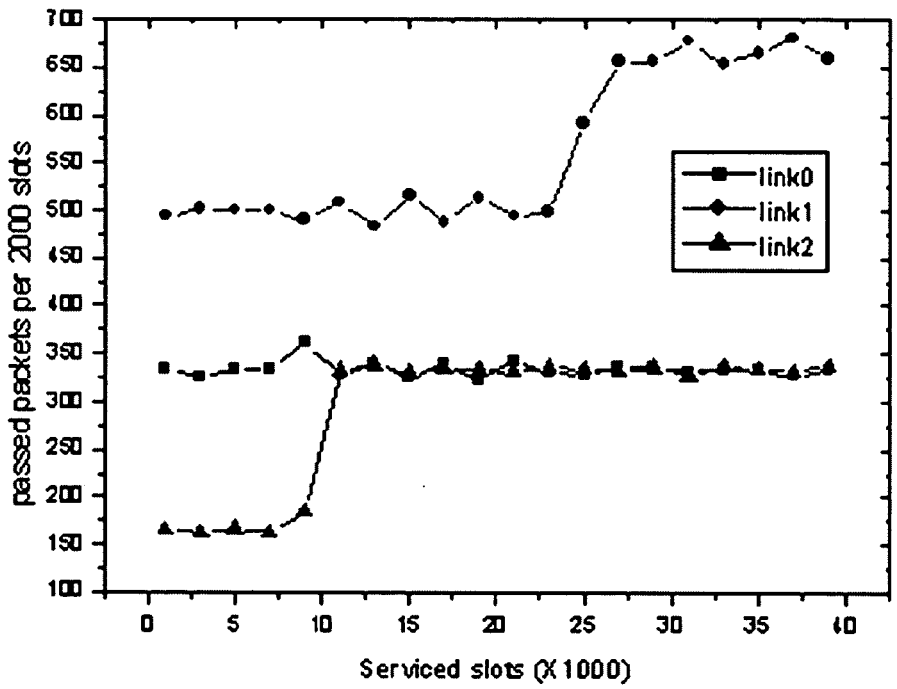
FIG. 8 is a view for showing throughput changes by link with time when the credit based scheme is used.
Figure 9:
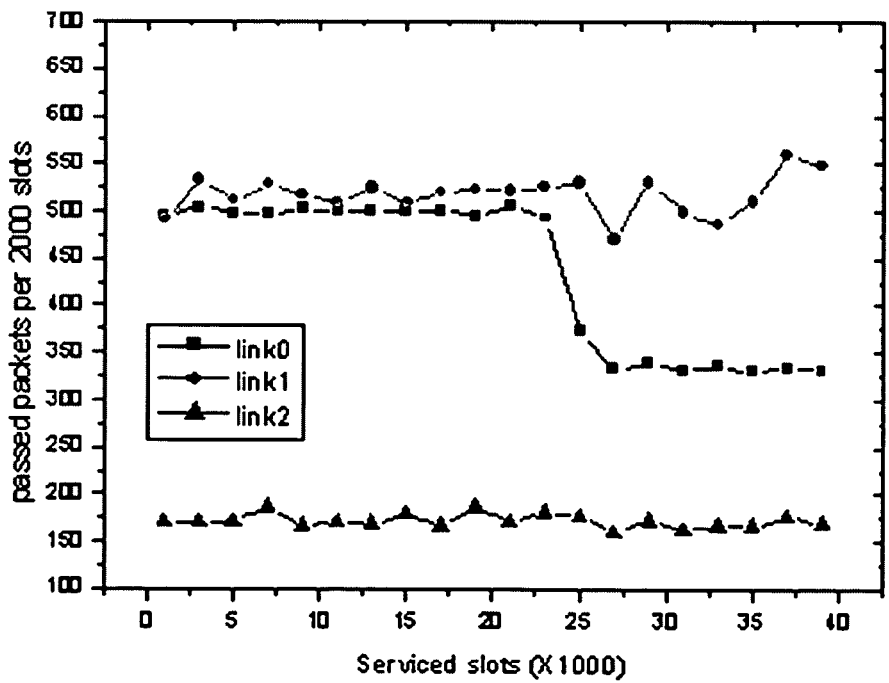
FIG. 9 is a view for showing throughput changes by link with time in case of use of the wireless communication method according to an embodiment of the present invention.

FIG. 8 and FIG. 9 show results observed by link that are related to the above phenomena. Viewing the throughputs by link with reference to the PMP node, the throughput of the link 1 having relatively large data flows in bilateral directions is the most excellent and the performance of the link 0 having a large amount of data traffic in the same direction is relatively lowered, when the QoS requirements by link as in FIG. 8 are not taken into account. However, the same traffic performance as in the flow 0 can be secured only when the throughputs of the link 0 and link 1 are simultaneously increased since the two links have substantially large data flows. Accordingly, the present invention shows that the performance of the relatively low-weighted link 2 is slightly lowered, but both link 0 and link 1 have an excellent performance.

Figure 10:
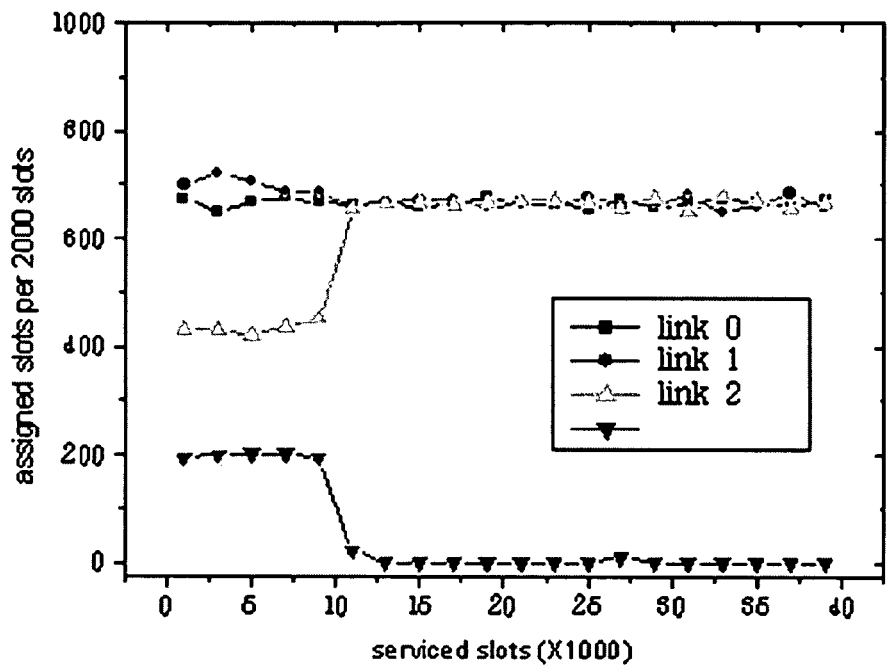
FIG. 10 is a view for showing slots assigned by link when the credit based scheme is used.
Figure 11:
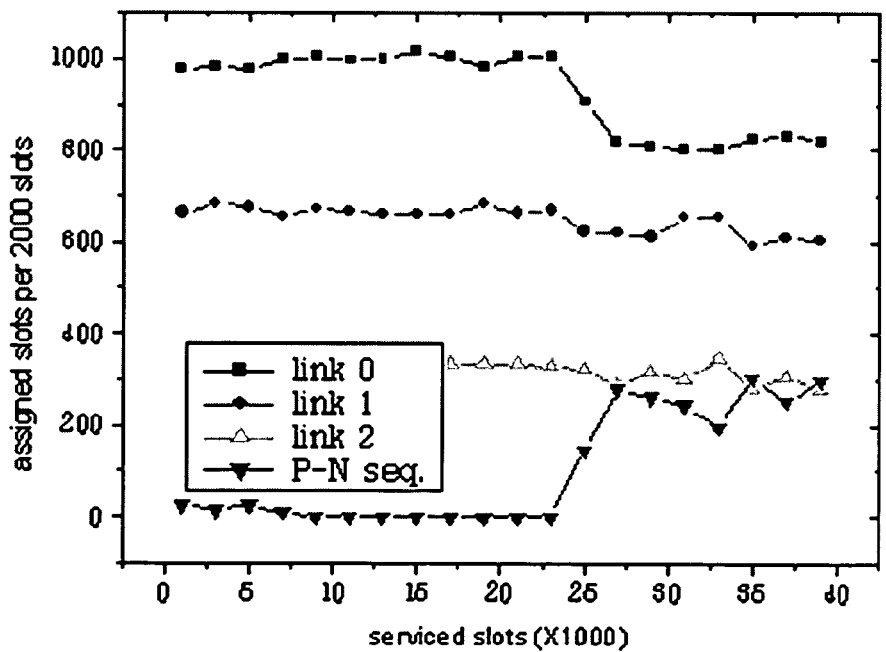
FIG. 11 is a view for showing slots assigned by link when the wireless communication method according to an embodiment of the present invention is used.

FIG. 10 and FIG. 11 are views for observing results applied in combination with a wireless communication method disclosed in the Republic of Korea Application No. 2002-68137 filed by the Applicant.

FIG. 10 is a view for showing a result obtained when a conventional communication method is applied. It can be observed that there are many CE interruptions due to POLL-NULL sequences from the point of 10000 slots up to the occurrence of Flow 2. In this case, slots can be abandoned or used inside a piconet. Accordingly, effort should be made to reduce such situations by suitably combining a piconet scheduling algorithm.

FIG. 11 is a view for showing a case where the wireless communication method according to an embodiment of the present invention is applied.

In FIG. 11, the occurrence of an initial POLL-NULL sequence can be prevented by an efficient scheduling at the PMP node, but the reduction of a flow through the link 0 due to the Flow 3 causes an occurrence of the POLL-NULL sequence.

Figure 12:
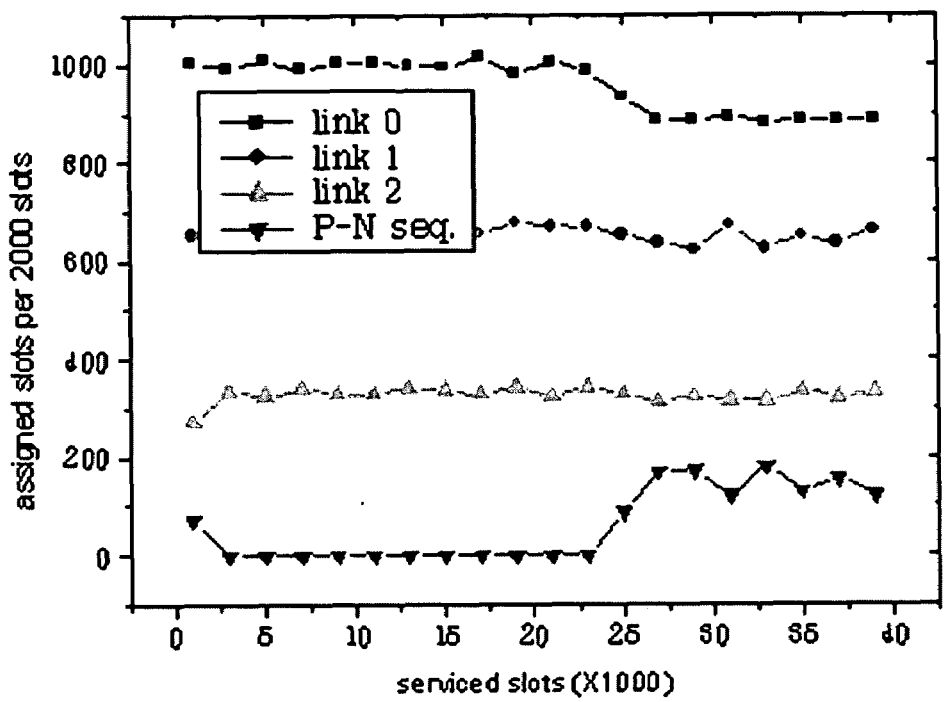
FIG. 12 is a view for showing slots assigned by link when a combination of the K-Fairness Policy (KFP) and the wireless communication method according to an embodiment of the present invention is used.

FIG. 12 shows a result obtained when the wireless communication method disclosed in the Republic of Korea Application No. 2002-68137 filed by the Applicant is combined with the wireless communication method according to an embodiment of the present invention in order to overcome the above problem. The Republic of Korea Application No. 2002-68137 discloses the wireless communication method which is capable of increasing the transmission efficiency in a wireless communication by changing rank among communication devices according to the queue condition of transmitted data. FIG. 12 shows the improvement of performance when the wireless communication method of Republic of Korea Application No. 2002-68137 is combined with the wireless communication method of the present invention.

Figure 13:
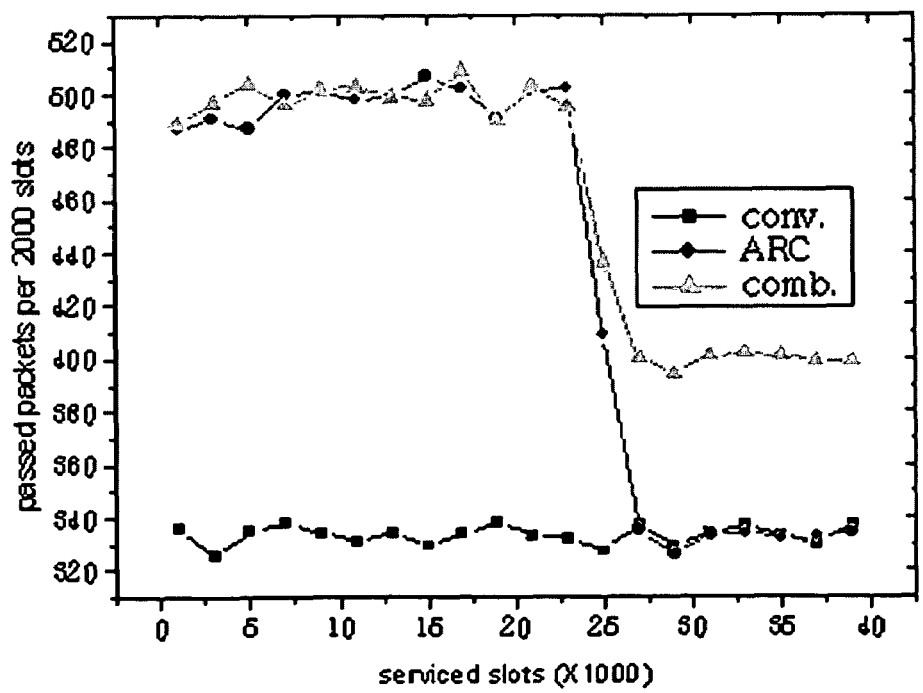
FIG. 13 is a view for showing packets through a link 0.

FIG. 13 shows a comparison of the number of packets passing through the link 0 with respect to the three cases described in FIG. 10 to FIG. 13. It can be seen in FIG. 13 that the performance becomes better when a scatternet algorithm and a piconet scheduling algorithm are combined together.

As described above, the present invention provides the wireless communication method that prevents the waste of wireless resources occurring in case of evenly distributing credits in an adaptive credit distribution and has a simplified structure with high throughput and fairness secured. Further, the wireless communication method enables the establishments of appropriate parameters based on QoS requirements of each link.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wireless communication method for a Bluetooth device connected to a plurality of piconets and operating in a scatter mode, comprising steps of:
   (a) establishing credit values by link for the plurality of piconets, and a total sum of respective credit values of links as a temporary account value;
   (b) updating the credit values by link and the temporary account value every slot based on a predetermined algorithm;
   (c) performing communications through a link selected based on a comparison result of the respective credit values of links at each Presence Point (PP); and
   (d) unevenly redistributing predetermined credit values based on respective characteristics of the links and returning to the step (b) in one of the two cases that the communications are interrupted with a POLL_NULL sequence and that the temporary account value becomes the same as the total number, n, of links,
   wherein the step (d) redistributes a credit value C to the respective credit values of links based on the inverse of $T_{scatter\_poll}$ temporary account value becomes the same as the total number, n, links, the $T_{scatter\_poll}$ being a parameter negotiated between corresponding pioconets by a Link Manager Protocol (LMP) with a scatternet formed.

2. The wireless communication method as claimed in claim 1, wherein the step (b) updates the respective credit values of links by incrementing a credit value of a link performing communications every slot and keeping credit values of other links unchanged, and updates the temporary account value by repeating procedures of incrementing the temporary account value by one every slot and decrementing the temporary account value by n if the temporary account value becomes the same as the total number, n, of the links.

3. The wireless communication method according to claim 2, wherein the credit value is incremented by one and the temporary account value is incremented by one in the step(b).

4. The wireless communication method as claimed in claim 1, wherein the step (c) performs the communications through a link having a largest credit value out of a respective credit values of links.

5. The wireless communication method as claimed in claim 1, wherein the step (d) redistributes a credit value C calculated by a following formula to credit values of links except for a link to which a POLL_NULL sequence is sent, based on the inverse of the $T_{scatter\_poll}$ by link, if the POLL_NULL sequence occurs, the following formula being:

$$C = \max\left(\left[\frac{n-1}{n}(ac_{red} - ac_{\min})\right], \left[\frac{n-1}{n}(ac_{red} - ac_{\max} + N_{switch-th})\right]\right),$$

where, n denotes the total number of links, $ac_{red}$ denotes a credit value of a link to be redistributed, $ac_{max}$ denotes the maximum credit value out of credit values of links to be redistributed, $ac_{min}$ denotes the minimum credit value out of credit values of links to be redistributed, and $N_{switch-th}$ denotes a threshold value for preventing frequent switchovers among piconets.

6. The wireless communication method as claimed in claim 1 wherein the credit values to be redistributed to the links are obtained by following formula:

$$\left(\left[\frac{T^{-1}_{scatter\_poll,1} \times c}{\sum_{i=1}^{n} T^{-1}_{scatter\_poll,i}}\right], \left[\frac{T^{-1}_{scatter\_poll,2} \times c}{\sum_{i=i}^{n} T^{-1}_{scatter\_poll,i}}\right], \ldots, n - \sum_{i=1}^{n-1}\left[\frac{T^{-1}_{scatter\_poll,i} \times c}{\sum_{i=1}^{n} T^{-1}_{scatter\_poll,i}}\right]\right).$$

7. A Bluetooth wireless communication apparatus connected to a plurality of piconets and operating in a scatter mode, comprising:
   a buffer unit for storing credit values by link for the plurality of piconets, and the total sum of the respective credit values of links as a temporary account value;
   a communication priority decision unit for updating the credit values by link and the temporary account value every slot based on a predetermined manner, and selecting a link to perform communications based on a comparison result of the credit values by link at each Presence Point(PP);
   a credit redistribution unit for unevenly redistributing predetermined credit values based on respective characteristics of links in one of the two cases in which the communications are interrupted with a POLL_NULL sequence and the temporary account value becomes the same as the total number, n, of links; and
   a communication initiation unit for initiating communications through a corresponding link selected in the communication priority decision unit,
   wherein, if a POLL_NULL sequence occurs, the credit redistribution unit redistributes a credit value C calculated by a following formula to credit values of links except for a corresponding link, based on the inverse of a $T_{scatter\_poll}$ by link, said following formula being:

$$C = \max\left(\left[\frac{n-1}{n}(ac_{red} - ac_{\min})\right], \left[\frac{n-1}{n}(ac_{red} - ac_{\max} + N_{switch-th})\right]\right),$$

where, n denotes the total number of links, $ac_{red}$ denotes a credit value of a link to be redistributed, $ac_{max}$ denotes the maximum credit value out of credit values of links to be redistributed, $ac_{min}$ denotes the minimum credit value out of credit values of links to be redistributed, and $N_{switch-th}$ denotes a threshold value for preventing frequent switchovers among piconets, and
   wherein, in the credit redistribution unit, the credit values to be redistributed to the links are obtained by following formula wherein the Tscatter_poll being a parameter negotiated between corresponding piconets by the link Manager Protocol (LMP) with a scatternet formed:

$$\left(\left[\frac{T^{-1}_{scatter\_poll,1} \times c}{\sum_{i=1}^{n} T^{-1}_{scatter\_poll,i}}\right], \left[\frac{T^{-1}_{scatter\_poll,2} \times c}{\sum_{i=i}^{n} T^{-1}_{scatter\_poll,i}}\right], \ldots, n - \sum_{i=1}^{n-1}\left[\frac{T^{-1}_{scatter\_poll,i} \times c}{\sum_{i=1}^{n} T^{-1}_{scatter\_poll,i}}\right]\right).$$

8. The wireless communication apparatus as claimed in claim 7, wherein the communication priority decision unit updates the credit values by link by incrementing by one a credit value of a link performing communications every slot and keeping credit values of the other links unchanged, and updates the temporary account value by repeating procedures of incrementing the temporary account value by one every slot and decrementing the temporary account value by n if the temporary account value becomes the same as the total number, n, of the links.

9. The wireless communication apparatus as claimed in claim 7, wherein the credit redistribution unit selects a link having the largest credit value out of the respective credit values of links as a link to perform communications.

10. The wireless communication apparatus as claimed in claim 7, wherein the credit redistribution unit redistributes a credit value C to the respective credit values of links based on the inverse of $T_{scatter\_poll}$, by link if the temporary account value becomes the same as the total number, n, of links.

* * * * *